US008333154B2

(12) United States Patent
Fukuyama et al.

(10) Patent No.: US 8,333,154 B2
(45) Date of Patent: Dec. 18, 2012

(54) INFLATOR

(75) Inventors: Takaki Fukuyama, Kiyosu (JP); Toru Ozaki, Kiyosu (JP); Hiroki Murase, Kiyosu (JP); Osamu Fukawatase, Toyota (JP); Yasushi Itou, Toyota (JP); Naoki Matsuda, Tatsuno (JP); Yusuke Komine, Tatsuno (JP); Tomoharu Kobayashi, Tatsuno (JP)

(73) Assignees: Toyota Jidosha Kabushiki Kaisha, Toyota-shi, Aichi-ken (JP); Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 13/313,903

(22) Filed: Dec. 7, 2011

(65) Prior Publication Data

US 2012/0090493 A1    Apr. 19, 2012

Related U.S. Application Data

(63) Continuation of application No. 12/672,084, filed as application No. PCT/JP2008/064028 on Aug. 5, 2008, now abandoned.

(30) Foreign Application Priority Data

Aug. 9, 2007    (JP) ................................. 2007-208256

(51) Int. Cl.
*B60R 21/26* (2011.01)
(52) U.S. Cl. .......................... 102/530; 280/736; 280/741
(58) Field of Classification Search .................. 102/530, 102/531; 280/736, 740, 741
See application file for complete search history.

(56) References Cited

U.S. PATENT DOCUMENTS 3,618,981 A * 11/1971 Leising et al. ................ 280/740
5,016,914 A    5/1991 Faigle et al.
5,248,162 A    9/1993 Levosinski et al.
5,273,311 A   12/1993 Geisreiter
5,335,940 A    8/1994 Cuevas
(Continued)

FOREIGN PATENT DOCUMENTS

DE    42 39 036    5/1993
(Continued)

OTHER PUBLICATIONS

Official Letter dated Apr. 4, 2011 for German Appl. No. 11 2008 002 147.3-21.

(Continued)

*Primary Examiner* — James Bergin
(74) *Attorney, Agent, or Firm* — Finnegan, Henderson, Farabow, Garrett & Dunner, LLP

(57) ABSTRACT

An inflator (1) comprised of an inner case (19) and an outer case (28). The inflator (1) includes a combustion chamber located inside the inner case (19), a plurality of gas discharge ports (16) formed on the outer case (28), a gas outlet port (11) formed on an outer surface of the inner case (19) and a gas guide section that guides the inflation gas exited the gas outlet port (11) toward the gas discharge ports (16). The gas guide section includes between the outer case (28) and inner case (19) a guide wall (13*a*) provided with a guide plane that contacts with and redirects the inflation gas. The guide plane is formed into an arc face so as to swivel the inflation gas exited the gas outlet port (11) in a swirl or helical fashion, guide the inflation gas toward the gas discharge ports (16) and capture residuals.

8 Claims, 9 Drawing Sheets

U.S. PATENT DOCUMENTS

| | | | |
|---|---|---|---|
| 5,562,303 | A | 10/1996 | Schleicher et al. |
| 5,589,662 | A | 12/1996 | Schleicher et al. |
| 5,613,702 | A | 3/1997 | Goetz |
| 5,630,618 | A | 5/1997 | Hamilton et al. |
| 6,095,558 | A | 8/2000 | Bayer et al. |
| 7,237,801 | B2 | 7/2007 | Quioc et al. |
| 2005/0082804 | A1 | 4/2005 | Khandhadia |

FOREIGN PATENT DOCUMENTS

| | | |
|---|---|---|
| DE | 42 31 521 | 3/1994 |
| DE | 100 18 915 | 10/2001 |
| JP | 3-112454 | 11/1991 |
| JP | 5-213146 | 8/1993 |
| JP | 5213145 | 8/1993 |
| JP | 3004037 | 8/1994 |
| JP | 7-9941 | 1/1995 |
| JP | 3015759 | 6/1995 |
| JP | 7-40304 | 7/1995 |
| JP | 08-198050 | 8/1996 |
| JP | 8-198050 | 8/1996 |
| JP | 11-500082 | 1/1999 |
| JP | 11/500082 | 1/1999 |
| JP | 2000-6745 | 1/2000 |
| JP | 2001-341610 | 12/2001 |
| JP | 2006-76558 | 3/2006 |
| JP | 3122258 | 5/2006 |
| JP | 3122259 | 5/2006 |
| JP | 2007-508979 | 4/2007 |
| JP | 2007-131254 | 5/2007 |

OTHER PUBLICATIONS

Notification of Reason(s) for Refusal for JP Appl. No. 2007-208256 dated Dec. 6, 2011.

English translation of JP 3-112454, dated Nov. 18, 1991.

English translation of JP 3004037 dated Aug. 24, 1994.

* cited by examiner

US 8,333,154 B2

INFLATOR

CROSS-REFERENCE TO RELATED APPLICATIONS

This application is a continuation application of U.S. application Ser. No. 12/672,084 filed Jan. 20, 2011, now abandoned, which is a national phase application of International Application No. PCT/JP2008/064028, filed Aug. 5, 2008, and claims the priority of Japanese Application No. 2007-208256, filed Aug. 9, 2007, the contents of each of which are incorporated herein by reference.

TECHNICAL FIELD

The present invention relates to a pyrotechnic inflator which generates inflation gas by combusting gas generating charge housed in its combustion chamber.

BACKGROUND ART

In a pyrotechnic inflator, inflation gas generated by combusting gas generating charge is hot and contains residuals. Conventionally, a generally cylindrical, mesh filter is provided on the outer circumference of the combustion chamber for cooling the inflation gas and removing the residuals. However, the filter is made of metal and therefore can be heavy and bulky. From the viewpoint of lightening and downsizing of the metal inflator, it is preferable to reduce the capacity of the filter. Prior art (for example, Patent Literature 1) discloses an inflator having a combustion chamber that houses gas generating charge and is provided with numerous gas outlet ports that allow exit of inflation gas, all along the circumference of the combustion chamber, a generally cylindrical bulkhead that is located around the combustion chamber to provide detour of inflation gas, and generally donut-shaped plate filters located on opposite ends in the axial direction of the bulkhead such that the inflation gas exited the gas outlet ports of the combustion chamber is cooled off while taking a roundabout path by the bulkhead and passing through the filters and exits to an exterior from gas discharge ports formed outside of the bulkhead.

To enhance lightening and downsizing of the inflator, it is desired to dispense with a filter. In response to such a demand, Patent Literature 2 and 3, by way of example, disclose a filterless inflator: the inflator includes an inner case which houses gas generating charge and an outer case located on the outer circumference in a circumferential direction of the inner case. The outer case includes a gas guide portion that has a zigzag shaped section when taken along an axial direction of the inflator and is provided on the outer end remote from the inner case with a gas discharge port which allows exit of inflation gas to an exterior of the inflator. In operation of this filterless inflator, a guide plane located on the inner circumference of the gas guide portion cools hot inflation gas exited gas outlet ports on the inner case and catches residuals while the gas hits the guide plane and is deflected by the guide plane, and then the gas exits to an exterior from the gas discharge ports of the gas guide portion.

Patent Literature 1: JP2007-131254

Patent Literature 2: Japanese Utility Model Registration No. 3122258

Patent Literature 3: Japanese Utility Model Registration No. 3122259

DISCLOSURE OF THE INVENTION

Problems to be Solved by the Invention

However, in the inflator of the Patent Literature 2 and 3, the gas guide portion is configured to have a zigzag shaped section by bending a plurality of plate metal materials, which form the outer case, generally orthogonally, and arranging the materials in a staggered fashion around the inner case. With this configuration, when inflation gas exits from the gas outlet ports formed on the outer circumference in a circumferential direction of the inner case, the gas hits a guide plane of the gas guide portion facing the outlet ports at high speed, which is likely to deform this region of the guide plane of the outer case in such a manner as to narrow an area proximate the gas discharge ports of the gas guide portion. This may hinder the quick outlet of the inflation gas.

The present invention contemplates to solve the problems described above, and has an object to provide an inflator that captures residuals securely and cools inflation gas, and discharges the inflation gas smoothly and quickly.

Means for Solving the Problems

The inflator of the invention includes:

an inner case;

an outer case mounted around the inner case;

a combustion chamber located inside the inner case and housing gas generating charge for combustion to generate inflation gas upon ignition of an ignition device;

a plurality of gas discharge ports formed on the outer case for discharging the inflation gas generated in the combustion chamber to an exterior;

a gas outlet port that is formed on an outer surface of the inner case and allows exit of the inflation gas generated in the combustion chamber; and a gas guide section that guides the inflation gas exited the gas outlet port toward the gas discharge ports.

The inflator is characterized in the following configuration: Both of the outer case and inner case are cylindrical in shape and the gas outlet port is formed on an end face in an axial direction of the inner case. The outer case includes a generally discoid wall that covers the end face in the axial direction of the inner case and a generally cylindrical circumferential wall that so extends from the outer circumferential edge of the wall as to cover an outer circumference in a circumferential direction of the inner case. The gas discharge ports are located on a region of the circumferential wall of the outer case remote from the generally discoid wall. The gas guide section includes between the outer case and inner case a guide wall provided with a guide plane that is an arc face in shape, contacts with and redirects the inflation gas and captures residuals. The guide wall is formed into a swirl as viewed from an axial direction of the inflator and located proximate the end face of the inner case having the outlet port and between the inner case and the outer case, such that the guide wall swivels an inflation gas exited the gas outlet port outwardly from a central area of the end face of the inner case in a swirl fashion along the guide plane and then makes the gas travel through a void provided between an inner circumferential plane in the circumferential direction of the outer case and an outer circumferential plane in a circumferential direction of the inner case in a helical fashion before the gas is discharged from the gas discharge ports.

In the gas guide section of the inflator of the invention, since the guide plane of the guide wall that contacts with inflation gas and captures residuals guides the inflation gas exited the gas outlet port toward the gas discharge ports while swiveling the gas in a swirl fashion and then in a helical fashion, the guide wall of the gas guide section is not likely to be so deformed as to narrow a sectional area of the channel of the inflation gas due to the pressure of the inflation gas, thus preventing decrease of speed and volume of the gas flow. As a result, the inflation gas exited the outlet port is smoothly and quickly discharged from the gas discharge ports.

Moreover, when the inflation gas generated in the combustion chamber flows into the gas guide section via the gas outlet port, the gas contacts the guide plane and is guided toward the gas discharge ports while being swiveled in a swirl fashion and then in a helical fashion. At this time, the guide plane of the gas guide section securely captures residuals which have greater specific gravity than the inflation gas due to centrifugal force exerted upon swiveling. Further, since the inflation gas flown into the gas guide section via the outlet port is swiveled in a swirl fashion and then in a helical fashion inside the gas guide section, reaches the gas discharge ports and is discharged from the gas discharge ports, the gas guide section is substantially longer than conventional inflators, and thus cooling the inflation gas smoothly. Consequently, the inflator of the invention securely captures residuals and cools inflation gas. With the inflator of the present invention, especially an inflation gas exited the gas outlet port is firstly swiveled in a swirl on the end face in the axial direction of the inner case, and then swiveled helically around the circumference in the circumferential direction of the inner case, and guided toward the gas discharge ports and discharged from the gas discharge ports. Therefore, the substantial length of the gas guide section is further elongated and the inflator discharges the inflation gas in a cleaned and cooled condition.

Therefore, the inflator of the invention securely captures residuals and cools inflation gas, and discharges the inflation gas smoothly and quickly.

In the inflator of the present invention it will also be appreciated that a plurality of the guide wall are formed in such a manner as to partition a space between the inner case and outer case and that the gas outlet port is formed between any adjacent guide walls.

With the inflator of the invention, the gas guide section is formed into a swirl on the end face of the inner case and between the inner case and outer case. This configuration does not make the gas guide section bulky, but makes the inflator as compact as possible. Further, since the gas guide section of the above inflator is located proximate the outer surface of the inflator between the inner case and outer case, the inflation gas can be cooled in an effective manner.

In this case, if the gas outlet port is formed on both end faces in the axial direction of the inner case and the guide plane is formed on both of the end faces of the inner case, the inflator is enabled to discharge a large quantity of inflation gas quickly. This configuration can be easily applied to such a type of inflator as has a combustion chamber split into two upper and lower sections and generates inflation gas in dual stages by differentiating the start of combustion in each section.

In the inflator of the invention moreover, since the gas discharge ports are formed on the outer circumference in the circumferential direction of the outer case, the substantial length of the gas guide section is further elongated in comparison with an instance where the gas discharge ports are formed on an end face in the axial direction of the outer case. Moreover, the inflation gas guided by the guide plane travels through the void provided between the inner circumferential plane in the circumferential direction of the outer case and the outer circumferential plane in the circumferential direction of the inner case before being discharged from the gas discharge ports. At this time, in the void between the outer case and inner case, the inflation gas flows generally helically toward the gas discharge ports due to influence of the redirection by the guide plane, and then exits the gas discharge ports. That is, the inflation gas travels along the inner circumferential plane in the circumferential direction of the outer case and accordingly, the inner circumferential plane in the circumferential direction of the outer case contacts with and guides the inflation gas, and captures residuals by the surface utilizing centrifugal force, thus capturing more residuals.

In the above inflator, furthermore, if, in a projected state as viewed from one side on the axial direction of the inner case, the guide plane on a first end face of the inner case is so configured as to redirect the inflation gas in an opposite direction to that by the guide plane on a second end face of the inner case, an inflation gas exited the gas outlet port on the first end face of the inner case and an inflation gas exited the gas outlet port on the second end face travel through the void between the inner circumferential plane in the circumferential direction of the outer case and the outer circumferential plane in the circumferential direction of the inner case helically in opposite directions. Thereafter, these two streams of inflation gas run into each other in the vicinity of the gas discharge ports, such that the directions of the streams are cancelled. Consequently, the inflation gas is radially and smoothly discharged from the gas discharge ports.

The above inflator may also include between the inner circumferential plane in the circumferential direction of the outer case and the outer circumferential plane in the circumferential direction of the inner case a wire member that helical in shape and separate from the outer case and inner case such that the region of the inner circumferential plane in the circumferential direction of the outer case and on an interspace of the wire member constitutes the guide plane.

With this configuration, since the helically curved wire member is prepared as a separate entity and located between the outer case and inner case to act as the guide wall, the manufacturing cost of the inflator is suppressed in comparison with an instance where the guide wall is integral with the outer case or inner case.

In this case, too, the gas outlet port may be located on both of the end faces in the axial direction of the inner case so the guide plane is located on both of the end faces of the inner case. Thus a large quantity of inflation gas is discharged quickly from the gas discharge ports. This configuration can be easily applied to such a type of inflator as has a combustion chamber split into two upper and lower sections and generates inflation gas in dual stages by differentiating the start of combustion in each section.

This configuration also helps suppress the manufacturing cost of the inflator since the helically curved wire member is prepared as a separate entity and located between the outer case and inner case to act as the guide wall.

DESCRIPTION OF REFERENCE SIGNS AND NUMERALS 1, 40, 48 . . . inflator,
3 . . . ignition device,
8 . . . combustion chamber,
9 . . . gas generating charge,
11 (11U, 11D) . . . gas outlet port,
12, 41, 49 . . . gas guide section,
13a, 46a . . . guide wall,
13b, 46b . . . guide plane,
16 . . . gas discharge port,
19, 19A . . . inner case,
28 . . . outer case,
42 . . . wire member, and
G1, G2 . . . inflation gas

BEST MODE FOR CARRYING OUT THE INVENTION

Figure 1:
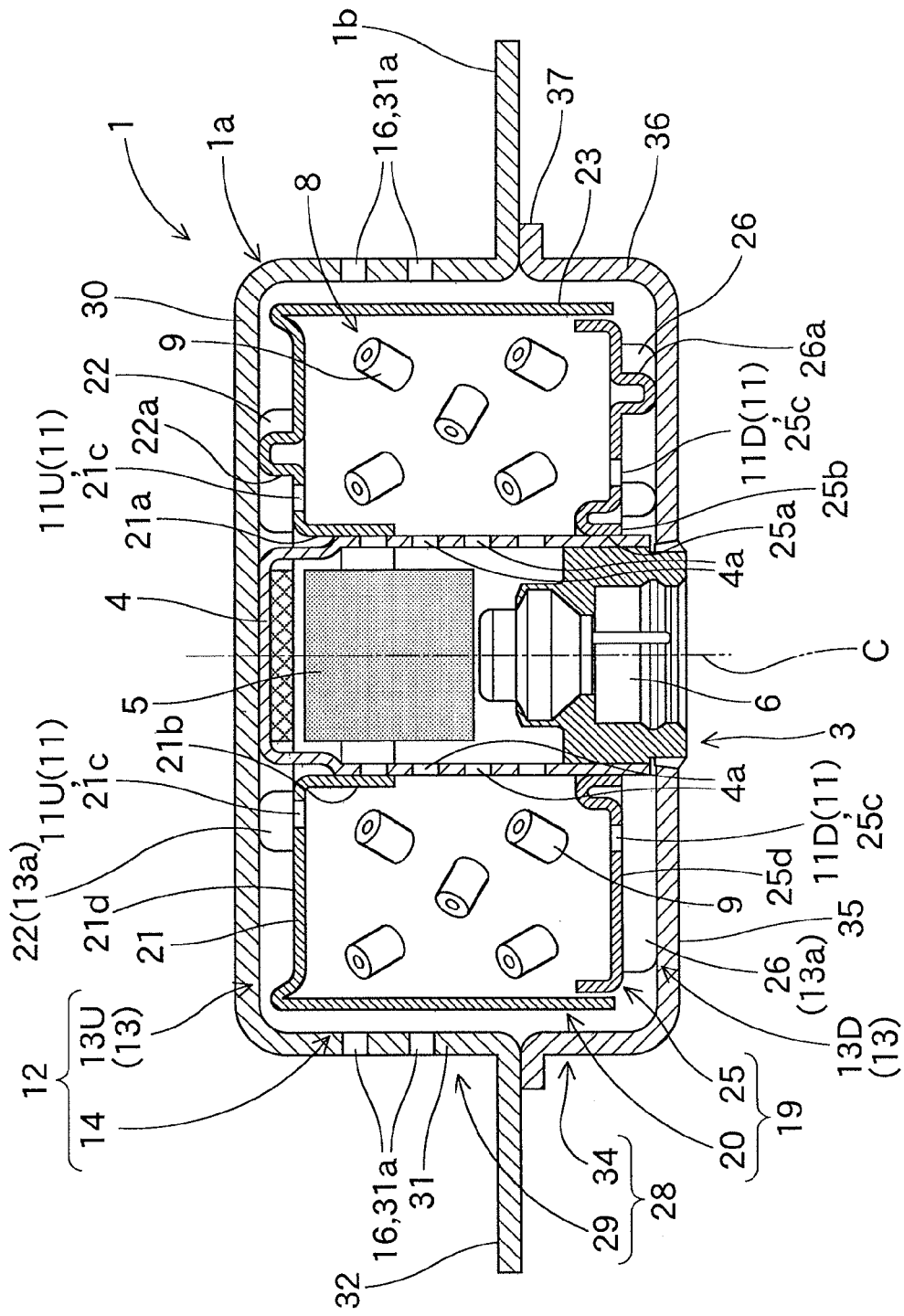
FIG. 1 is a schematic sectional view of an inflator according to the first embodiment of the invention.

Embodiments of the present invention are described below with reference to the accompanying drawings. An inflator 1 of the first embodiment is for use in an airbag apparatus mountable on a vehicle. In this embodiment, as shown in FIG. 1, the inflator 1, which is of a disc type, includes a generally columnar body 1a and a flange 1b projecting from the outer circumference of the body 1a. In this embodiment, the flange 1b is formed on a position to the bottom of the body 1a relative to the center of the length direction (vertical direction) extending along the axial direction of the body 1a. The flange 1b is provided on a plurality of locations in a circumferential direction with insert holes 1c for receiving means for securing the inflator 1 to a case or the like for housing the folded-up airbag (see FIG. 2).

In this embodiment, unless otherwise specified, a "vertical direction" is intended to refer to the direction extending along the center axis C of the inflator 1. That is, the upper side refers to the side where booster propellant 5 is stored in the later-described ignition device 3 (i.e. the upper side in FIG. 1) whereas the lower side refers to the side where the initiator 6 is supported in the ignition device 3 (i.e. the lower side in FIG. 1)

Figure 2:
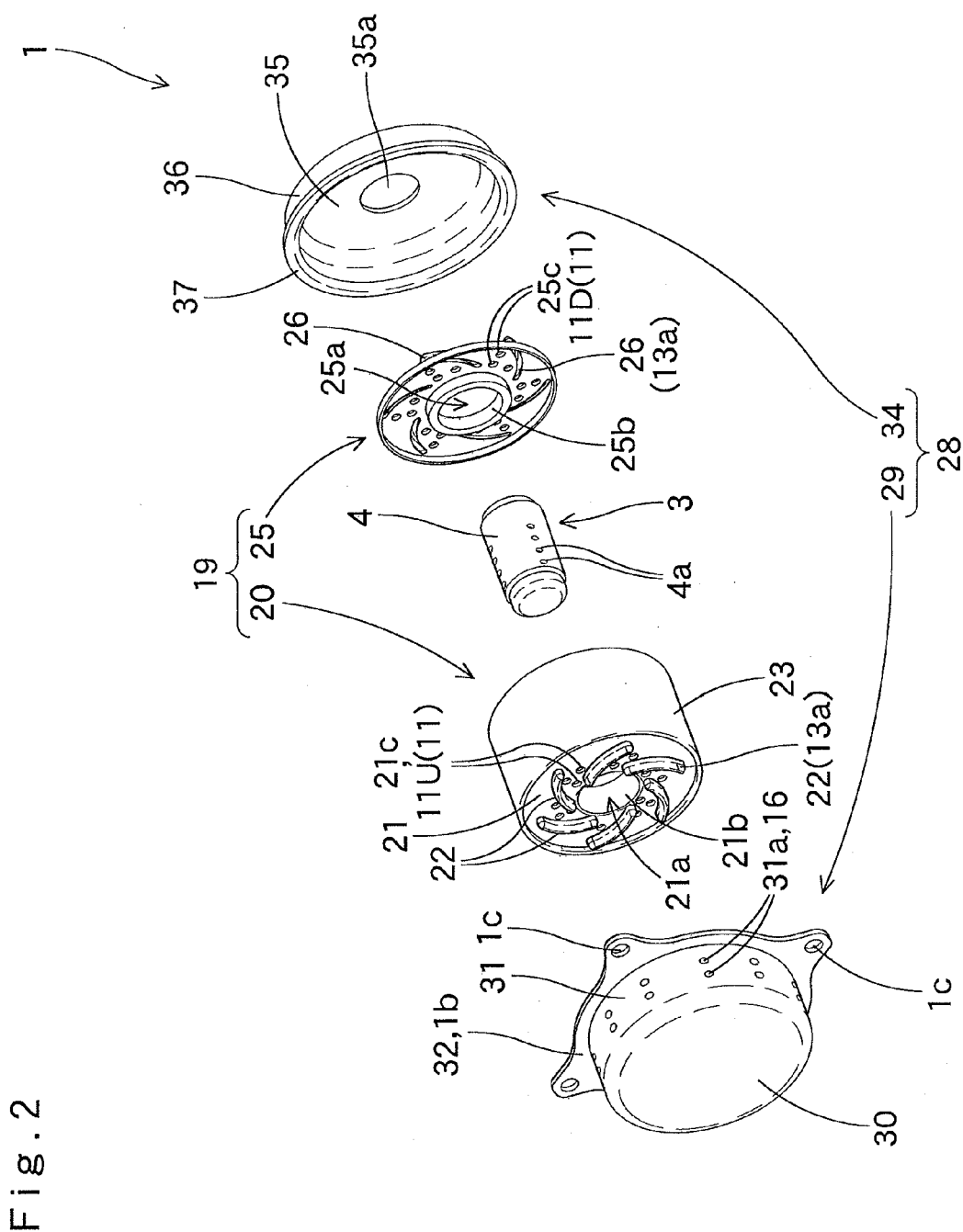
FIG. 2 is a schematic exploded perspective view of the inflator of the first embodiment.

As shown in FIGS. 1 and 2, the body 1a of the inflator 1 includes an ignition device 3, a combustion chamber 8 filled with gas generating charge 9 for combustion upon ignition, a plurality of gas outlet ports 11 spaced about the axis of the body 1a for letting out inflation gas G1 generated in the combustion chamber 8, a gas guide section 12 located around the combustion chamber 8 for redirecting the inflation gas G1 exited the gas outlet ports 11 and a plurality of gas discharge ports 16 located on the outer circumference of the body 1a along the circumferential direction for discharging the inflation gas G1 in the gas guide section 12 to an exterior. As shown in FIGS. 1 and 2, the inflator 1 of the first embodiment is comprised of a generally cylindrical inner case 19 and a generally cylindrical outer case 28 which covers the inner case 19 all over while leaving a clearance over a generally entire area between the inner case 19 and outer case 28. In the inflator 1 of the first embodiment, an interior of the inner case 19 acts as the combustion chamber 8. The gas outlet ports 11 are formed on the outer surface of the inner case 19. The gas discharge ports 16 are formed on the outer case 28. Inflation gas G1 exited the gas outlet ports 11 travels through the gas guide section 12 provided between the inner case 19 and outer case 28 and then is discharged from the gas discharge ports 16.

As shown in FIG. 1, the ignition device 3 of the embodiment is formed to penetrate the inner case 19 along the center axis C of the body 1a of the inflator 1 in the center of the body 1a. The ignition device 3 includes a case 4 which is formed into a generally cylinder closed at the leading end (at the top), booster propellant 5 housed on the leading end (top) region of the case 4, an initiator 6 supported at the root region (the bottom) of the case 4 and operable to ignite the booster propellant 5. Upon operation of the initiator 6, the booster propellant 5 is ignited and combusted for building a fire, and the fire is propagated into the combustion chamber 8 through numerous through holes 4a formed on the outer circumference in a circumferential direction of the case 4, and thus the gas generating charge 9 is ignited for combustion. In this embodiment, the leading end plane (top plane) of the case 4 of the ignition device 3 projects out of the outer plane of a later-described end wall 21 of the inner case 19 and abuts against the inner surface of a later-described upper wall 30 of the outer case 28 (see FIG. 1).

As shown in FIG. 1, the combustion chamber 8 is surrounded by the inner case 19 and the ignition device 3, and houses the gas generating charge 9. The inner case 19 is generally cylindrical in shape, and includes a main body 20 which is formed into a generally cylinder closed at the top and opened at the bottom, and a lid section 25 which is generally discoid in shape and located at the bottom in such a manner as to close off the opening of the main body 20. The main body 20 includes a generally discoid end wall 21 located on the top and a generally cylindrical circumferential wall 23 extending downward from the outer circumferential edge of the end wall 21. The end wall 21 and the lid section 25 are respectively provided with a through hole 21a/25a for receiving the case 4 of the ignition device 3, and each of the through holes 21a and 25a is provided on the inner circumference with a projecting wall 21b/25b that projects toward an interior of the combustion chamber 8 and abuts against the outer circumference of the case 4 of the ignition device 3 all over the circumference.

Figure 3:
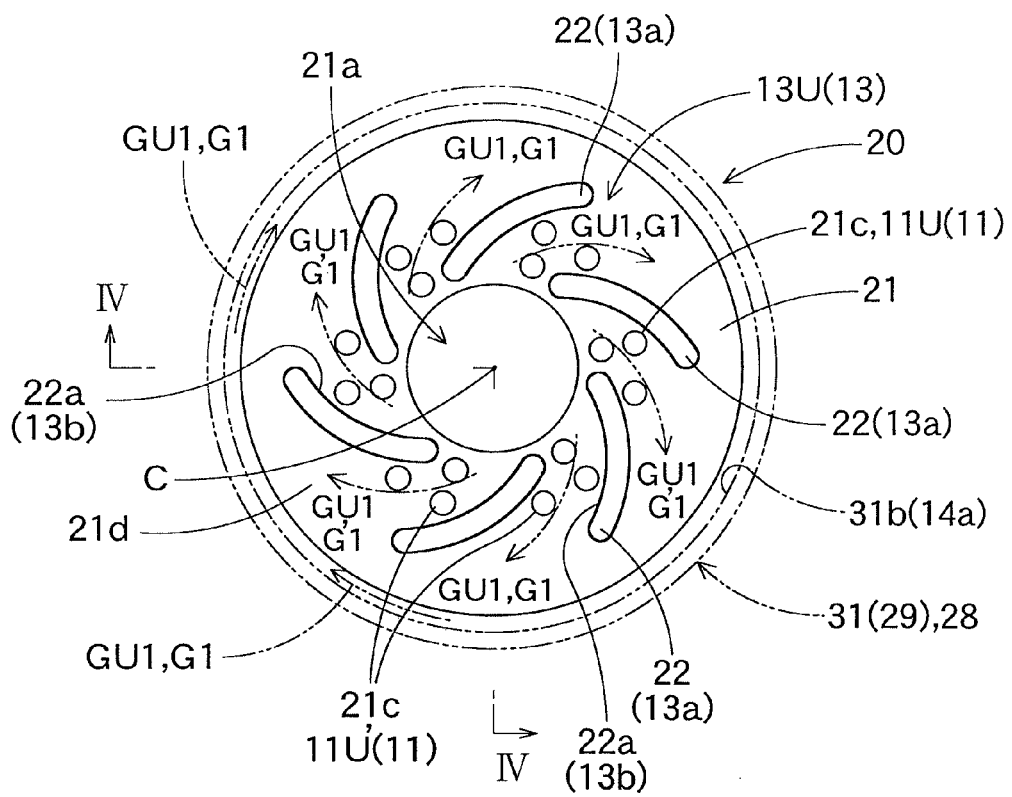
FIG. 3 is a plan view of a body of the inner case of the inflator of the first embodiment.
Figure 4:
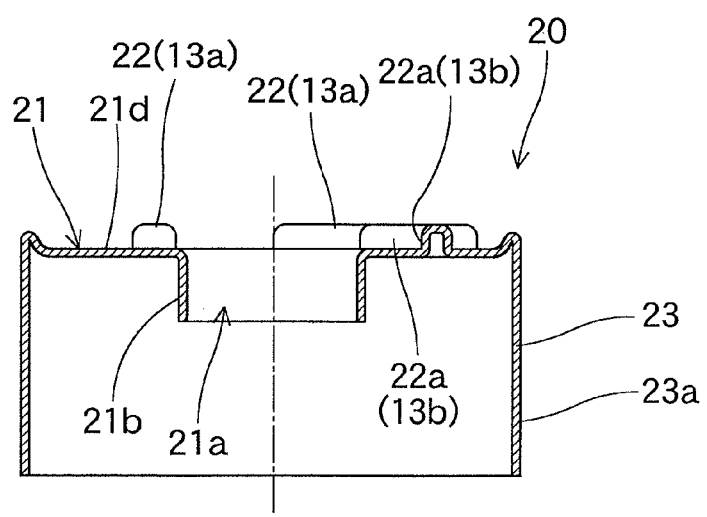
FIG. 4 is a schematic section taken along line IV-IV of FIG. 3.
Figure 5:
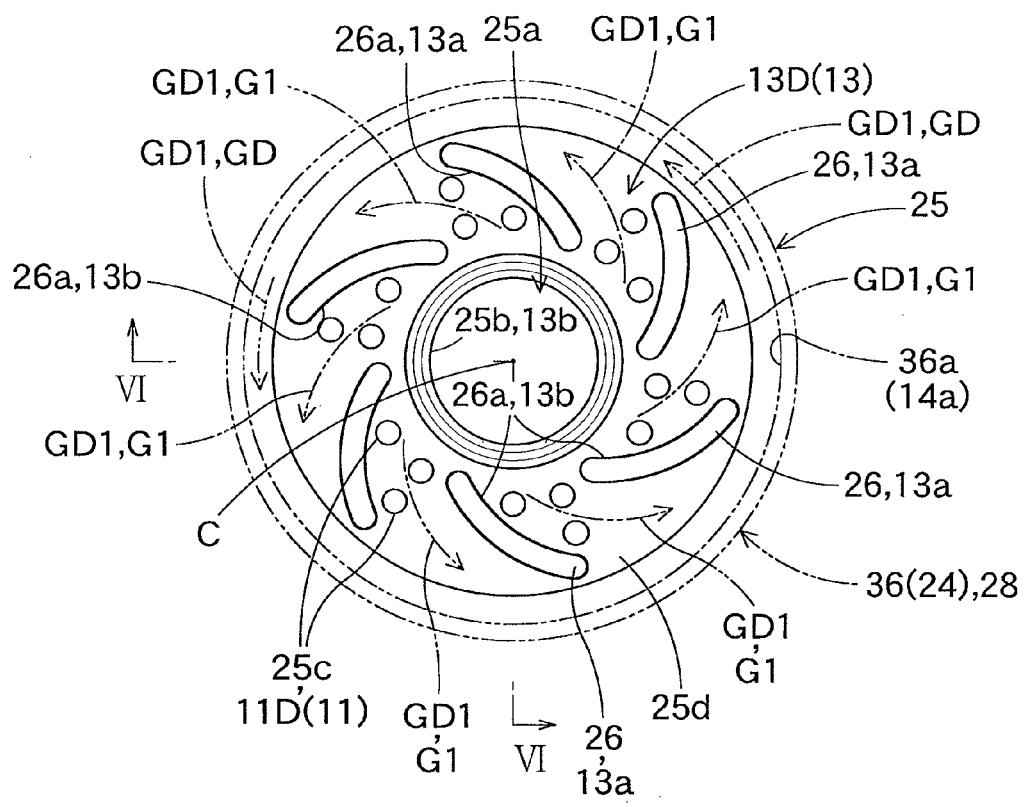
FIG. 5 is a bottom view of a lid section of the inner case of the inflator of the first embodiment.
Figure 6:
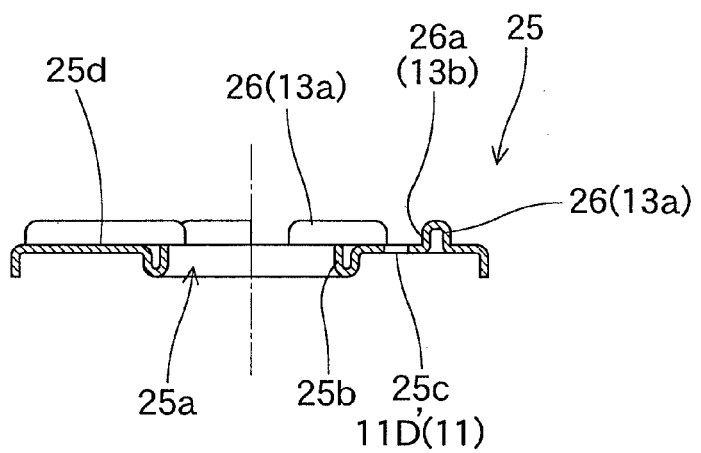
FIG. 6 is a schematic section taken along line VI-VI of FIG. 5.

As shown in FIGS. 1 to 6, each of the end wall 21 and lid section 25, which are located on end faces in the axial direction of the inner case 19, includes a plurality of partitioning portions 22/26 each of which has a generally inverse-U shaped section and projects toward the outer case 28 and abuts against the inner surface of later-described upper wall 30/lower wall 35 of the outer case 28. In this embodiment, six partitioning portions 22 and 26, respectively, are formed on the end wall 21/lid section 25 generally in a equally spaced fashion about the center axis C of the inflator 1 (about the center of the through hole 21a/25a). As shown in FIGS. 3 and 5, each of the partitioning portions 22 and partitioning portions 26 extend outwardly from the periphery of the through hole 21a/25a in a expanding fashion so the partitioning portions 22 and 26 respectively form a convolution as viewed from the axial direction. Each of the partitioning portions 22 and each of the partitioning portions 26 curves in a generally arcuate fashion. These partitioning portions 22 and 26 formed on opposite ends of the axial direction of the inner case 19 constitute guide walls 13a of a later-described upstream region 13 of the gas guide section 12. Inner side planes 22a and 26a of the partitioning portions 22 and 26, which are located on the inner sides facing away from the direction to which each of the partitioning portions 22 and 26 bulges toward, constitute guide planes 13b that are arc face in shape, contact with and redirect inflation gas G1, and capture residuals making use of centrifugal force (see FIGS. 3 and 5). In this embodiment, the partitioning portions 22 located on the end wall 21 are formed into a clockwise swirl as viewed from the outside on the axial direction (i.e. from an upper side) whereas the partitioning portions 26 located on the lid section 25 are formed into a counterclockwise swirl, i.e. contrary to the partitioning portions 22, in a projected state as viewed from the outside on the axial direction (i.e. from a lower side) as shown in FIGS. 3 and 5. Each of the end wall 21 and lid section 25 is provided, on a peripheral area of the through hole 21a/25a surrounded by the partitioning portions 22/26, with three, generally round apertures 21c/25c, respectively. These apertures 21c and 25c constitute gas outlet ports 11 that allow exit of inflation gas generated inside the combustion chamber 8.

As shown in FIGS. 1 and 2, the outer case 28 is comprised of a generally cylindrical upper member 29 that is closed at the top and open at the bottom and a generally cylindrical lower member 34 that is closed at the bottom and open at the top. The upper member 29 includes a generally discoid upper wall 30 covering the top of the inner case 19, a generally cylindrical circumferential wall 31 extending downward from the outer circumferential edge of the upper wall 30, and a flange 32 extending outwardly toward a direction perpendicular to the axis of the circumferential wall 31 from the lower end of the circumferential wall 31. In this embodiment, the flange 32 of the upper member 29 forms the flange 1b of the inflator 1. The circumferential wall 31 is provided with numerous, generally round apertures 31a in the vicinity of the center in a vertical direction and remote from the upper wall 30, all over the circumferential area. The apertures 31a form gas discharge ports 16 that discharge inflation gas to an exterior. The lower member 34 includes a generally discoid lower wall 35 covering the bottom of the inner case 19, a generally cylindrical circumferential wall 36 extending upward from the outer circumferential edge of the lower wall 35, and a flange 37 extending outwardly toward a direction perpendicular to the axis of the circumferential wall 36 from the upper end of the circumferential wall 36. The lower wall 35 includes at the center a round opening 35a for receiving the initiator 6 of the ignition device 3 so the initiator is exposed. The flange 37 of the lower member 34 serves to fix the lower member 34 to the upper member 29, and is fixed to the lower side of the flange 32 of the upper member 29 by welding or the like, thus integrating the outer case 28. The outer case 28 is formed into such a size that provides a clearance generally all around the inner case 19. In this embodiment, the flange 32 of the upper member 29 is located slightly below the center in a vertical direction of the outer case 28.

The case 4 of the ignition device 3, the inner case 19 and outer case 28 of the inflator 1 of the first embodiment are made of such steel as stainless steel.

Figure 7:
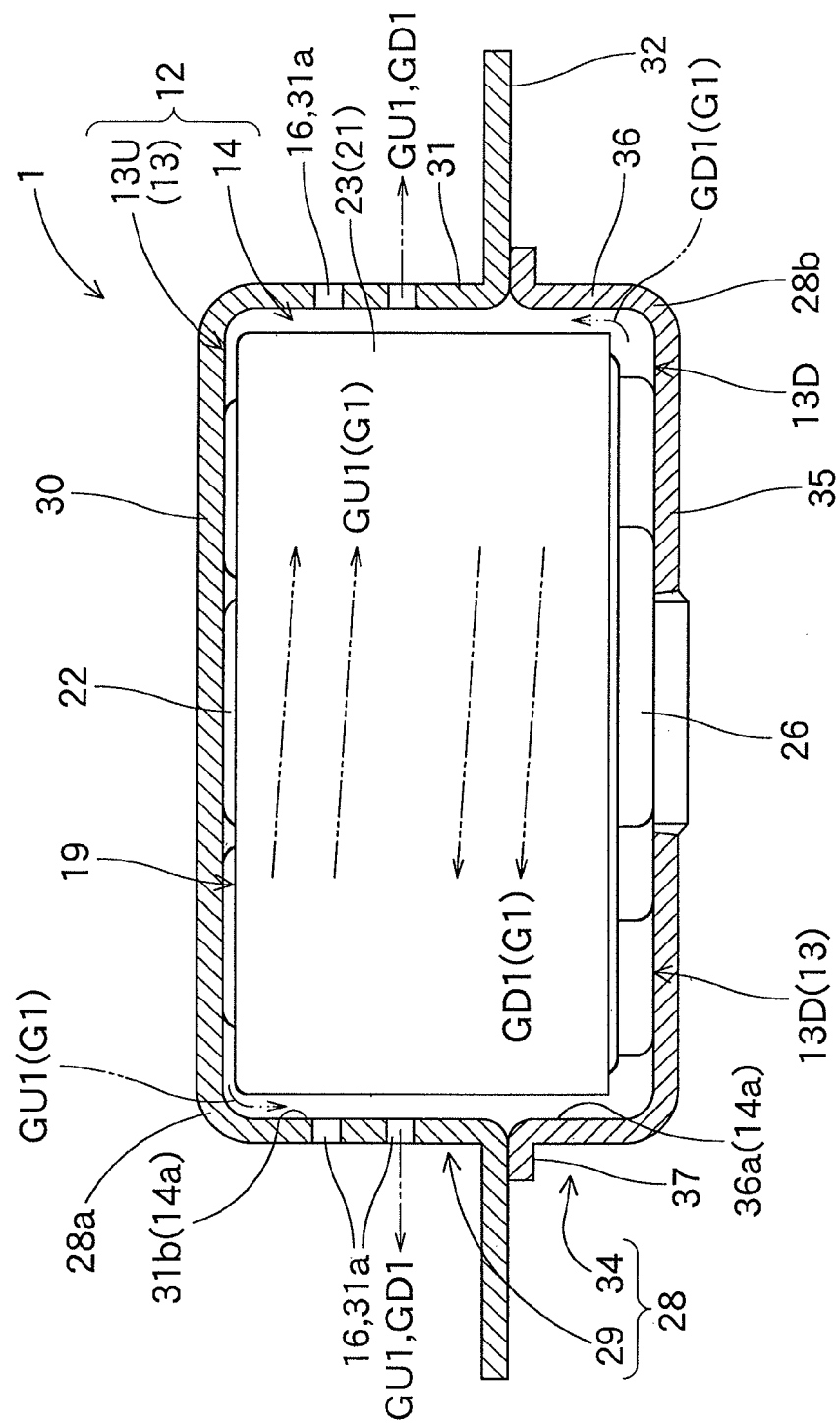
FIG. 7 is a schematic section of the inflator of the first embodiment illustrating the flow of inflation gas inside the downstream region of the gas guide section upon activation of the inflator.

In the inflator 1 of the first embodiment, the region defined by the partitioning portions 22, the outer surface 21d of the end wall 21 of the inner case 19 and the inner circumferential plane of the upper wall 30 of the outer case 28 as well as the region defined by the partitioning portions 26, the outer surface 25d of the lid section 25 of the inner case 19 and the inner circumferential plane of the lower wall 35 of the outer case 28 form the upstream region 13 of the gas guide section 12 that guides inflation gas G1 exited the gas outlet ports 11 whereas the clearance formed between the circumferential wall 23 of the inner case 19 and the circumferential walls 31 and 36 of the outer case 28 forms the downstream region 14 of the gas guide section 12. As shown in FIGS. 3 and 5, the inflation gas G1 exited the gas outlet ports 11 and flown into the gas guide section 12 flows through the upstream region 13 of the gas guide section 12 while contacting the guide planes 13b comprised of the inner side planes 22a and 26a of the partitioning portions 22 and 26 (i.e. guide walls 13a) and thus being swirled, and then flows through the downstream region 14 of the gas guide section 12 as shown in FIG. 7 and is discharged from the gas discharge ports 16. In the inflator 1 of the first embodiment, since the partitioning portions 22 and 26 (guide walls 13a) constituting the upstream region 13 of the gas guide section 12 curve in a swirl fashion, the inflation gas G1 exited the gas outlet ports 11 flows through the upstream region 13 while being swiveled in a swirl fashion along the guide planes 13b of the guide walls 13a (i.e. the inner side planes 22a, 26a of the partitioning portions 22 and 26), and flows through the downstream region 14 in a generally swirl fashion as well due to the influence of the flow in the upstream region 13, as shown in FIG. 7, and then is discharged from the gas discharge ports 16. At this time, in the downstream region 14, the inner circumferential planes 31b and 36a of the circumferential walls 31 and 36 of the outer case 28 constitute a guide plane 14a that is arc face in shape, contacts with and redirects the inflation gas G1 and captures residuals utilizing centrifugal force (refer to FIGS. 3, 5 and 7).

In the first embodiment, since the guide planes 13b of the guide walls 13a (i.e. the inner side planes 22a, 26a of the partitioning portions 22 and 26) of the gas guide section 12 that contact with inflation gas G1 and capture residuals redirect the inflation gas G1 exited the gas outlet ports 11 in a swirling fashion, the guide walls 13a of the gas guide section 12 are not likely to be so deformed as to narrow a sectional area of the channel of the inflation gas G1 due to the pressure of the inflation gas G1, thus preventing decrease of speed and volume of flow. More specifically, the guide planes 13b of the guide walls 13a are comprised of the inner side planes 22a and 26a of the partitioning portions 22 and 26, and the inner side planes 22a and 26a of the partitioning portions 22 and 26 do not confront the gas outlet ports 11 but extend along the direction of flow of the inflation gas G1 exited the gas outlet ports 11. Therefore, the inner side planes 22a and 26a are hard to be affected by the pressure of the inflation gas G1, such that the guide walls 13a are hard to deform in such a manner as to narrow the sectional area of the channel of the inflation gas G1. As a result, the inflation gas G1 exited the outlet ports 11 is smoothly and quickly discharged from the gas discharge ports 16.

In the inflator 1 of the first embodiment, moreover, when the inflation gas G1 generated in the combustion chamber 8 flows into the gas guide section 12 via the gas outlet ports 11, the gas G1 contacts the guide planes 13b (the inner side planes 22a and 26a of the partitioning portions 22 and 26) located in the upstream region 13 of the gas guide section 12 and is guided toward the gas discharge ports 16 while being swiveled in a swirl fashion as shown in FIGS. 3 and 5. At this time, the guide planes 13b (the inner side planes 22a and 26a of the partitioning portions 22 and 26) in the upstream region 13 of the gas guide section 12 securely capture residuals which have greater specific gravity than the inflation gas G1 due to centrifugal force exerted upon swiveling. Further, since the inflation gas flown into the gas guide section 12 via the outlet ports 11 is swiveled in a swirl fashion inside the upstream region 13 of the gas guide section 12, reaches the gas discharge ports 16 via the downstream region 14 and then is discharged from the gas discharge ports 16, the gas guide section 12 is substantially longer than conventional inflators, thus cooling the inflation gas G1 smoothly. Especially in the first embodiment, the inflation gas G1 is discharged from the gas discharge ports 16 via the downstream region 14 after traveling through the upstream region 13. At this time, in the downstream region 14 comprised of a void provided between the circumferential wall 23 of the inner case 19 and circumferential walls 31 and 36 of the outer case 28 as well, the inflation gas G1 flows generally helically toward the gas discharge ports 16 due to influence of the flow in the upstream region 13 as shown in FIG. 7, before exiting the gas discharge ports 16. At this time, the inner circumferential planes 31b and 36a of the circumferential walls 31 and 36 of the outer case 28 contact with and redirect the inflation gas G1, and capture residuals by the surfaces utilizing centrifugal force as the guide plane 14a. This configuration enables the inflator 1 of the first embodiment to capture more residuals because inflation gas flows through a substantially longer channel compared with an instance where inflation gas flows through the downstream region 14 merely along the axial direction, thus cooling the inflation gas G1 further in the downstream region 14. Consequently, the inflator 1 of the first embodiment securely captures residuals and cools inflation gas G1.

Therefore, the inflator 1 of the first embodiment securely captures residuals and cools inflation gas, and discharges the inflation gas G1 smoothly and quickly.

Furthermore, in the inflator 1 of the first embodiment, the upstream region 13 of the gas guide section 12 is formed to extend in a swirl fashion along end faces in an axial direction of the inner case 19 between the inner case 19 and outer case 28, whereas the downstream region 14 of the gas guide section 12 is located between the inner circumferential planes 31b and 36a of the circumferential walls 31 and 36 in a circumferential direction of the outer case 28 and the outer circumferential plane 23a of the circumferential wall 23 in a circumferential direction of the inner case 19. This configuration does not make the gas guide section 12 bulky, but makes the inflator 1 as compact as possible. Further, since the gas guide section 12 of the inflator 1 of the first embodiment is located proximate the outer surface of the inflator 1 between the inner case 19 and outer case 28, the inflation gas G1 can be cooled in an effective manner.

In addition, in the inflator 1 of the first embodiment, the gas outlet ports 11 are formed on both end faces in the axial direction of the inner case 19, i.e., on the end wall 21 and lid section 25, and the guide planes 13b in the upstream region 13 of the gas guide section 12 are located on both end faces in the axial direction of the outer case 28, i.e., on the upper wall 30 and lower wall 35. This configuration allows a large quantity of inflation gas G1 to exit the gas discharge ports 16. Without considering such an advantage, the gas outlet ports and gas guide section may be formed on only one of the end faces in an axial direction of the inner case.

In the inflator 1 of the first embodiment, the inflation gas GU1 exited the gas outlet ports 11U formed on the end wall 21 (i.e. on the upper side) flows through the upstream region 13U in a clockwise swirl whereas the inflation gas GD1 exited the gas outlet ports 11D formed on the lid section 25 (i.e. on the lower side) flows through the upstream region 13D in the contrary, i.e. counterclockwise swirl (refer to FIGS. 3 and 5).

Accordingly, the inflation gas GU1 exited the gas outlet ports 11U flows through the downstream region 14 of the gas guide section 12 clockwise and helically from the upper end 28a to the lower end 28b of the outer case 28 whereas the inflation gas GD1 exited the gas outlet ports 11D flows through the downstream region 14 contrarily, i.e., counterclockwise and helically from the lower end 28b to the upper end 28a of the outer case 28 (refer to FIG. 7). Thereafter, the inflation gases GU1 and GD1 run into each other proximate the center in a vertical direction of the downstream region 14 (i.e. in the vicinity of the gas discharge ports 16), such that the directions of the stream of the inflation gases GU1 and GD1 are cancelled. Consequently, the gases GU1 and GD1 are radially discharged from the gas discharge ports 16 lining up all along the circumferential direction.

Figure 8:
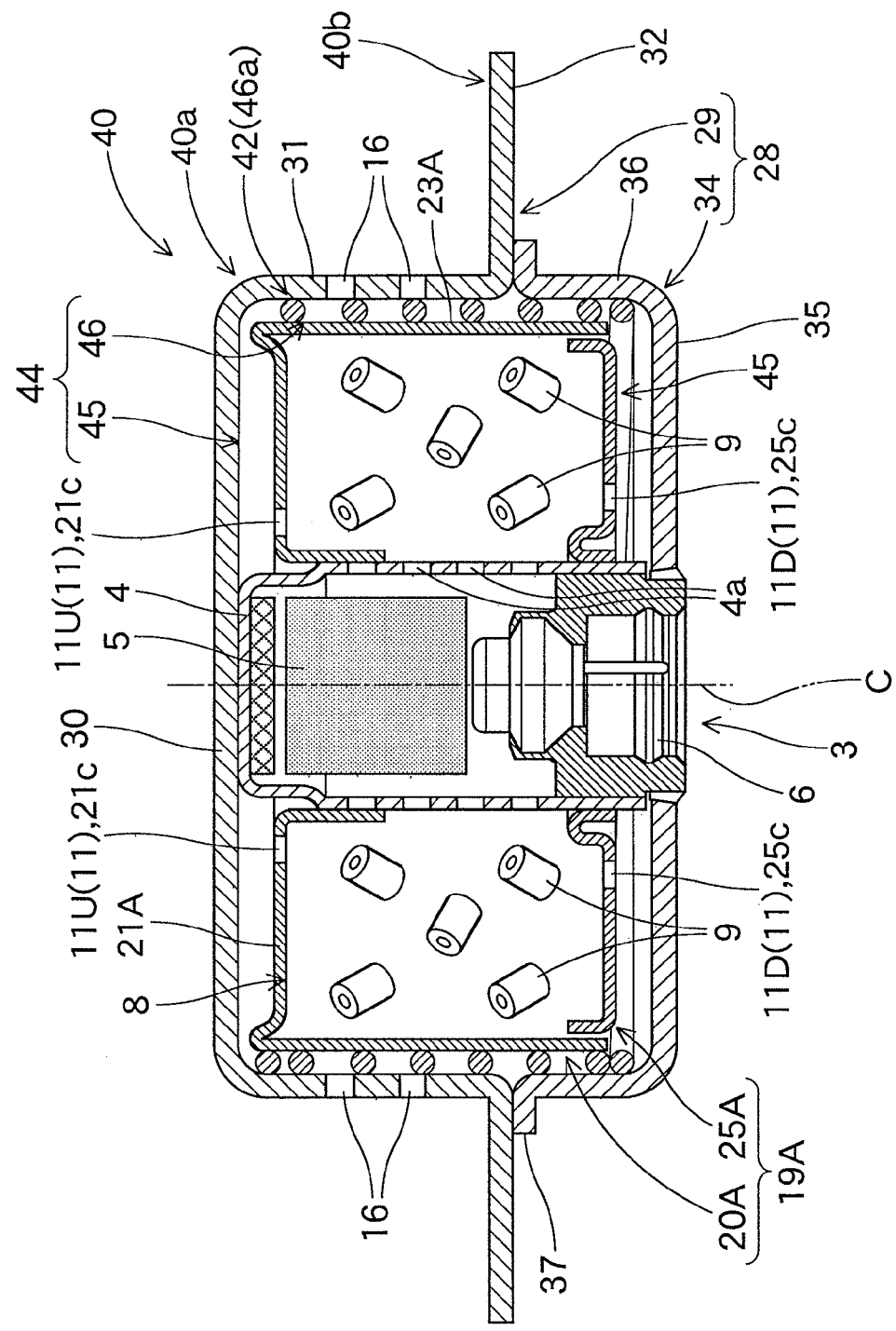
FIG. 8 is a schematic sectional view of an inflator according to the second embodiment of the invention.
Figure 9:
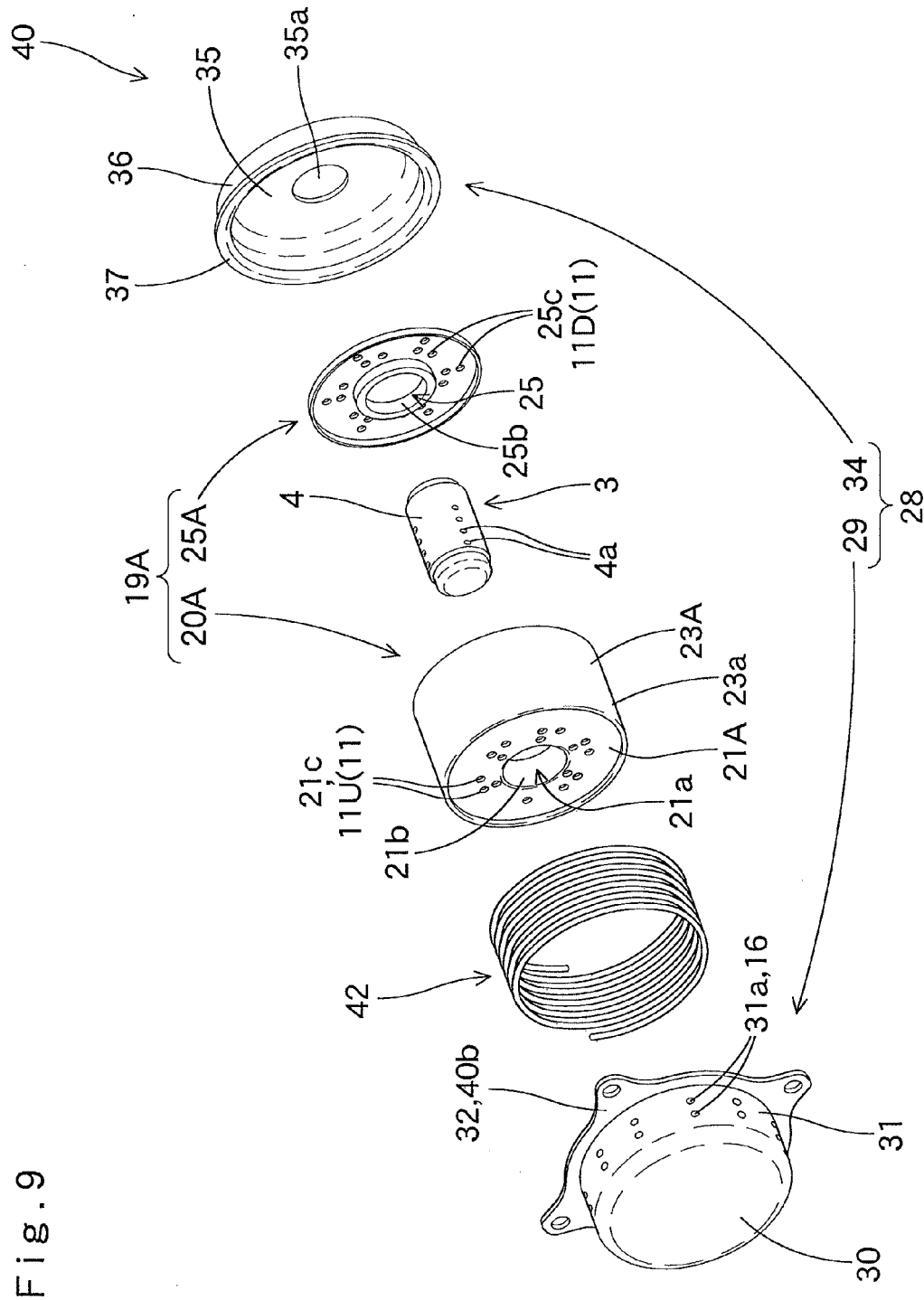
FIG. 9 is a schematic exploded perspective view of the inflator of the second embodiment.

An inflator 40 according to the second embodiment is now described. As shown in FIGS. 8 and 9, similarly to the inflator 1 of the first embodiment, the inflator 40, which is of a disc type as well, includes a generally columnar body 40a and a flange 40b projecting from the outer circumference of the body 40a. The inflator 40 has a similar structure to the inflator 1 described above except in a gas guide section 44, an inner case 19A, and a wire member 42 located between a circumferential wall 23A of the inner case 19A and circumferential walls 31 and 36 of the outer case 28 and curved in a helical fashion. Therefore, descriptions of common members will be omitted by using common reference signs. The inner case 19A has a similar structure to the inner case 19 of the inflator 1 described above except in that the end wall 21A and lid section 25A are respectively formed into a flat plates and do not include the partitioning portions. Therefore, descriptions of common members will be omitted by using common reference signs and further assigning "A" to ends of the reference signs.

The wire member 42 helically curved and located between the inner case 19A and outer case 28 is made of such metal as iron and prepared separate from the inner case 19A and outer case 28. The wire member 42 is located generally all over the vertical area between the circumferential wall 23A of the inner case 19A and circumferential walls 31 and 36 of the outer case 28. More specifically, the wire member 42 is formed by helically curving or coiling, at generally equal spaces, a wire material having a generally round section whose outer diameter is sized to generally stuff the clearance between the circumferential wall 23A and circumferential walls 31 and 36. The void provided in between wires of the wire member 42 in the clearance between the circumferential walls 23A, 31 and 36 constitutes a later-described downstream region 46 of the gas guide section 44 whereas the wire member 42 itself forms a guide wall 46a of the gas guide section 44.

In the inflator 40 of the second embodiment, an area proximate the gas outlet ports 11 and defined by the end wall 21A of the inner case 19A and upper wall 30 of the outer case 28 and an area proximate the gas outlet ports 11 and defined by the lid section 25A of the inner case 19A and lower wall 35 of the outer case 28 constitute an upstream region 45 of the gas guide section 44. As described above, the void located inside the inner circumferential plane in a circumferential direction of the outer case 28 and defined by the circumferential walls 23A, 31 and 36 and the wire member 42 constitutes the downstream region 46 of the gas guide section 44 whereas the inner circumferential planes 31b and 36a of the circumferential walls 31 and 36 of the outer case 28 form a guide plane 46b (see FIG. 10) that is arc face in shape, contacts with and redirects inflation gas G2, and captures residuals making use of centrifugal force.

In the inflator 40 of the second embodiment, the inflation gas G2 exited the gas outlet ports 11 and flown into the gas guide section 44 firstly flows radially outwardly from the gas outlet ports 11 located proximate the center axis C, and then flows into the downstream region 46. Then the gas G2 flows helically from opposite ends to the center in the axial direction while contacting the guide plane 46b comprised of the inner circumferential planes 31b and 36a of the circumferential walls 31 and 36 of the outer case 28, and exits the gas discharge ports 16.

In the inflator 40 of the second embodiment, too, since the guide plane 46b of the guide wall 46a of the gas guide section 44 that contacts with inflation gas G2 and captures residuals redirects the inflation gas G2 exited the gas outlet ports 11 helically toward the gas discharge ports 16, the guide wall 46a of the gas guide section 44 is not likely to be so deformed as to narrow a sectional area of the channel of the inflation gas G2 due to the pressure of the inflation gas G2, thus preventing decrease of speed and volume of the gas flow. More specifically, the guide wall 46a is comprised of the wire member 42 and the guide plane 46b is comprised of the inner circumferential planes 31b and 36a of the circumferential walls 31 and 36 of the outer case 28, and both of them are remote from the gas outlet ports 11. Therefore, the guide wall 46a and guide plane 46b are hard to be affected by the pressure of the inflation gas G2 and hard to deform in such a manner as to narrow the sectional area of the channel of the inflation gas G2. As a result, the inflation gas G2 exited the outlet ports 11 is smoothly and quickly discharged from the gas discharge ports 16.

Moreover, in the inflator 40 of the second embodiment, too, when the inflation gas G2 generated in the combustion chamber 8 flows into the gas guide section 44 via the gas outlet ports 11, the gas G2 contacts the guide plane 46b (the inner circumferential planes 31b and 36a of the circumferential walls 31 and 36 of the outer case 28) located in the downstream region 46 of the gas guide section 44 and is guided toward the gas discharge ports 16 while being swiveled helically. At this time, the guide plane 46b (the inner circumferential planes 31b and 36a of the circumferential walls 31 and 36 of the outer case 28) in the downstream region 46 of the gas guide section 44 securely captures residuals which have greater specific gravity than the inflation gas G2 due to centrifugal force exerted upon swiveling. Further, since the inflation gas flown into the gas guide section 44 via the outlet ports 11 is swiveled helically inside the downstream region 46 of the gas guide section 44, reaches the gas discharge ports 16 and then is discharged from the gas discharge ports 16, the gas guide section 44 is substantially longer than conventional inflators, such that the inflation gas G2 is smoothly cooled. Consequently, the inflator 40 of the second embodiment securely captures residuals and cools inflation gas G2.

Therefore, the inflator 40 of the second embodiment securely captures residuals and cools inflation gas, and discharges the inflation gas G2 smoothly and quickly. Furthermore, in the inflator 40 of the second embodiment, too, the upstream region 45 of the gas guide section 44 is formed along the end faces in an axial direction of the inner case 19A between the inner case 19A and outer case 28, whereas the downstream region 46 of the gas guide section 44 is helically provided between the inner circumferential planes 31b and 36a of the circumferential walls 31 and 36 in a circumferential direction of the outer case 28 and the outer circumferential plane 23a of the circumferential wall 23 in a circumferential direction of the inner case 19A. This configuration does not make the gas guide section 44 bulky, but makes the inflator 40 as compact as possible. Further, since the gas guide section 44 of the inflator 40 of the second embodiment is located proximate the outer surface of the inflator 40 between the inner case 19A and outer case 28, the inflation gas G2 can be cooled in an effective manner.

Figure 10:
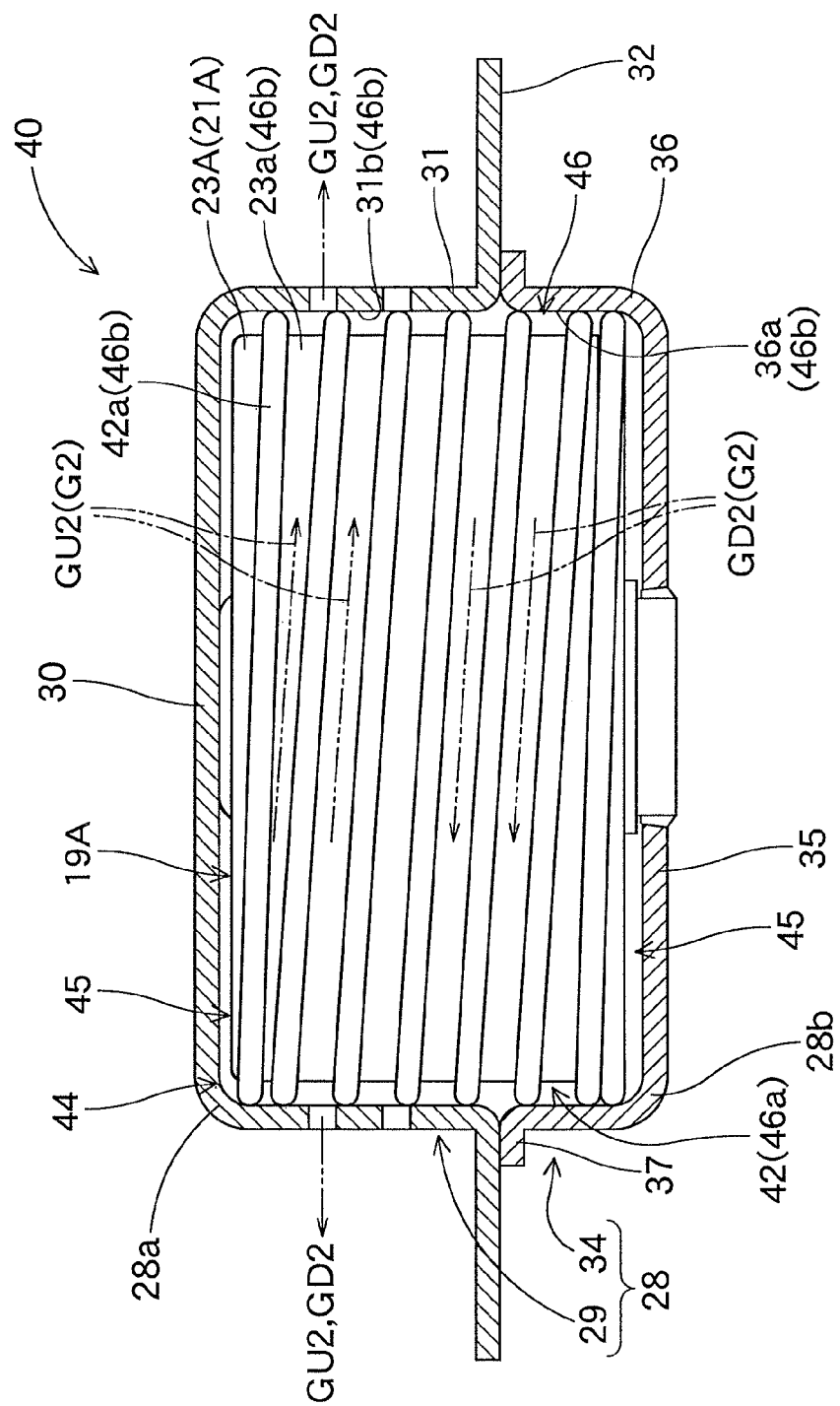
FIG. 10 is a schematic section of the inflator of the second embodiment illustrating the flow of inflation gas inside the downstream region of the gas guide section upon activation of the inflator.

In the inflator 40 of the second embodiment, too, the inflation gas GU2 exited the gas outlet ports 11U flows through the downstream region 46 of the gas guide section 44 along the wire member 42 in a clockwise helical fashion from the upper end 28a toward the lower end 28b of the outer case 28 whereas the inflation gas GD2 exited the gas outlet ports 11D flows through the downstream region 46 along the wire member 42 contrarily, i.e., in a counterclockwise helical fashion from the lower end 28b toward the upper end 28a of the outer case 28 (refer to FIG. 10). Thereafter, the inflation gases GU2 and GD2 run into each other proximate the center in a vertical direction of the downstream region 46 (i.e. in the vicinity of the gas discharge ports 16), such that the directions of the stream of the inflation gases GU2 and GD2 are cancelled. Consequently, the gases GU2 and GD2 are radially discharged from the gas discharge ports 16 lining up all along the circumferential direction.

Moreover, in the inflator 40 of the second embodiment, since the gas outlet ports 11 are formed on the end faces in the axial direction of the inner case 19A, i.e. on the end wall 21A and lid section 25A, the downstream region 46 of the gas guide section 44 arranged on the inner circumference in the circumferential direction of the outer case 28, away from the gas outlet ports 11, is hard to be affected by the inflation gas G2 exiting the gas outlet ports 11. Further, since the gas discharge ports 16 are located on the outer circumference of the outer case 28, i.e. on the circumferential wall 31, the substantial length of the gas guide section 44 is further elongated.

In addition, in the inflator 40 of the second embodiment, the gas outlet ports 11 are formed on both end faces in the axial direction of the inner case 19A, i.e., on the end wall 21A and lid section 25A, a large quantity of inflation gas G2 is allowed to exit the gas discharge ports 16. Without considering such an advantage, the gas outlet ports may be formed on only one of the end faces in an axial direction of the inner case.

Figure 11:
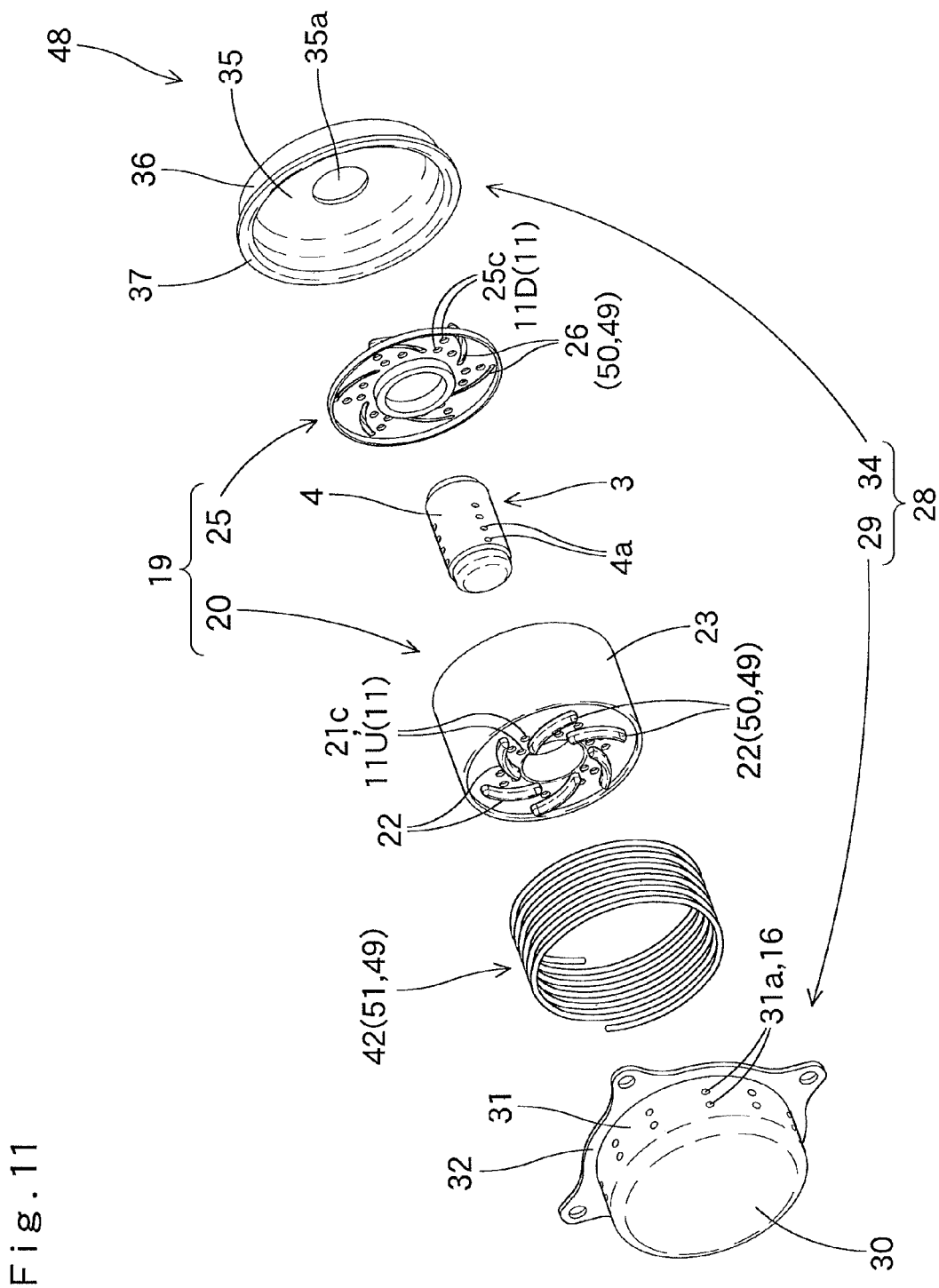
FIG. 11 is a schematic exploded perspective view of an inflator according to the third embodiment of the invention.

As the third embodiment, an inflator 48 is shown in FIG. 11, which is formed by adding a wire member 42 used in the inflator 40 of the second embodiment to the inflator 1 of the first embodiment, between the circumferential wall 23 of the inner case 19 and circumferential walls 31 and 36 of the outer case 28. With the inflator 48 thus configured, the inflation gas exited the gas outlet ports 11 is firstly swiveled in a swirl by the inner side planes 22a and 26a (first guide plane) of the partitioning portions 22 and 26 of the inner case 19 constituting the upstream region 50 of the gas guide section 49, and then flows along the wire member 42 constituting the downstream region 51 of the gas guide section 49 and is swiveled helically by the inner circumferential planes 31b and 36a (second guide planes) of the circumferential walls 31 and 36 of the outer case 28, and is discharged from the gas discharge ports 16. Therefore, the substantial length of the gas guide section 49 is further elongated, and the inflator 48 discharges the inflation gas in a cleaned and cooled condition.

The configuration of the inflators 1, 40 and 48 of the first to third embodiments where both of the end faces in the axial direction of the inner case 19 and 19A, i.e., both of the end wall 21, 21A and the lid section 25, 25A, include the gas outlet ports 11 can be easily applied to such a type of inflator as has a combustion chamber split into two upper and lower sections and generates inflation gas in dual stages by differentiating the start of combustion in each section.

In the inflators 1, 40 and 48 of the first to third embodiments, the gas outlet ports 11 are formed on both end faces in the axial directions of the inner case 19 and 19A whereas the gas discharge ports 16 are formed on the outer circumference in the circumferential direction of the outer case 28. However, the location of the gas outlet ports and discharge ports should not be limited thereby. It will be also appreciated, under the condition of sufficiency of cooling of inflation gas and capture of residuals, that the gas outlet ports are located proximate the center of an end face in an axial direction of the inner case whereas the gas discharge ports are located proximate the outer periphery of an end face in an axial direction of the outer case, in the inflator of the first embodiment. Further alternatively, in the second embodiment, the gas outlet ports may be located proximate a first end in an axial direction of the circumferential wall of the inner case whereas the gas discharge ports proximate a second end in an axial direction of the circumferential wall of the outer case.

In the inflator 1 of the first embodiment, although the partitioning portions 22 and 26 project from the inner case 19 to form the gas guide section 12, the partitioning portions may be formed on the outer case, or may even be prepared separate from the inner case or outer case. In the inflator 40/48 of the second/third embodiment, the wire member 42, which is prepared as a separate entity, is located between the inner case 19/19A and outer case 28 to form the gas guide section 44/48. However, it will also be appreciated that a helically projecting object is formed to project from the inner case or outer case so as to form the gas guide section. However, forming such a helical projecting object integral with the outer case or inner case will increase the manufacturing cost. From the viewpoint of suppressing the manufacturing cost, therefore, it is preferable to prepare the wire member separate from the outer case and inner case as in the foregoing embodiments.

The invention claimed is:

1. An inflator comprising:
an ignition device having an ignition-device case with holes defined in an outer circumference of the ignition-device case;
an inner case;
an outer case mounted around the inner case;
a combustion chamber located inside the inner case and housing gas generating charge for combustion to generate an inflation gas upon ignition of the ignition device, wherein a fire propagates into the combustion chamber through the holes defined in the ignition-device case;
a plurality of gas discharge ports formed on the outer case for discharging the inflation gas generated in the combustion chamber to an exterior;
a gas outlet port that is formed on an outer surface of the inner case and allows exit of the inflation gas generated in the combustion chamber; and
a gas guide section that guides the inflation gas exited the gas outlet port toward the gas discharge ports,
wherein:
both of the outer case and inner case are cylindrical in shape:
the gas outlet port is formed on an end face in an axial direction of the inner case;
the outer case includes a generally discoid wall that covers the end face in the axial direction of the inner case and a generally cylindrical circumferential wall that so extends from the outer circumferential edge of the wall as to cover an outer circumference in a circumferential direction of the inner case;
the gas discharge ports are located on a region of the circumferential wall of the outer case remote from the generally discoid wall;
the gas guide section includes between the outer case and inner case a guide wall provided with a guide plane that is an arc face in shape, contacts with and redirects the inflation gas and captures residuals; and
the guide wall is formed into a swirl as viewed from an axial direction of the inflator and located proximate the end face of the inner case having the outlet port and between the inner case and the outer case such that the guide wall swivels an inflation gas exited the gas outlet port outwardly from a central area of the end face of the inner case in a swirl fashion along the guide plane and then makes the gas travel through a void provided between an inner circumferential plane in the circumferential direction of the outer case and an outer circumferential plane in a circumferential direction of the inner case in a helical fashion before the gas is discharged from the gas discharge ports.

2. The inflator as set forth in claim 1, wherein:
a plurality of the guide wall are formed in such a manner as to partition a space between the inner case and outer case; and
the gas outlet port is formed between any adjacent guide walls.

3. The inflator as set forth in claim 1, wherein:
the gas outlet port is formed on both end faces in the axial direction of the inner case; and
the guide plane is formed on both of the end faces of the inner case.

4. The inflator as set forth in claim 3, wherein:
in a projected state as viewed from one side on the axial direction of the inner case, the guide plane on a first end face of the inner case is so configured as to redirect the inflation gas in an opposite direction to that by the guide plane on a second end face of the inner case.

5. The inflator as set forth in claim 1, further comprising between the inner circumferential plane in the circumferential direction of the outer case and the outer circumferential plane in the circumferential direction of the inner case a wire member acting as the guide wall, the wire member being helical in shape and separate from the outer case and inner case,
wherein a region of the inner circumferential plane in the circumferential direction of the outer case and on an interspace of the wire member constitutes the guide plane.

6. The inflator as set forth in claim 5, wherein:
the gas outlet port is formed on both end faces in the axial direction of the inner case; and
the guide plane is formed on both of the end faces of the inner case.

7. The inflator as set forth in claim 1, wherein:
the ignition device further includes an initiator supported at a root region of the ignition-device case; and
a leading end plane of the ignition-device case extends beyond the outer surface of the inner case.

8. The inflator as set forth in claim 7, wherein the ignition device further includes a booster propellant housed in a leading end region of the ignition-device case.

* * * * *